United States Patent [19]

Pryor

[11] 4,413,813
[45] Nov. 8, 1983

[54] DISPOSABLE BED FILTER APPARATUS

[75] Inventor: Michael J. Pryor, Woodbridge, Conn.

[73] Assignee: Olin Corporation, New Haven, Conn.

[21] Appl. No.: 342,433

[22] Filed: Jan. 25, 1982

Related U.S. Application Data

[62] Division of Ser. No. 200,342, Oct. 24, 1980, Pat. No. 4,330,327.

[51] Int. Cl.³ .................... C21C 7/04; B01D 23/20; B01D 23/24
[52] U.S. Cl. .................... 266/216; 266/227; 266/231; 210/232; 210/281; 210/289; 210/291; 210/198.1
[58] Field of Search .................... 75/68 R, 76, 93 AD, 75/93 R; 266/231, 227, 216; 210/773, 232, 263, 269, 270, 281, 282, 287, 289, 290, 291, 285, 286, 198.1, 205, 206

[56] References Cited

U.S. PATENT DOCUMENTS

| 952,972 | 3/1910 | Allen | 210/282 |
|---|---|---|---|
| 1,201,302 | 10/1916 | Jayne | 210/289 |
| 2,307,512 | 1/1943 | Kelly | 75/76 |
| 2,772,002 | 11/1956 | Mauro | 210/289 |
| 2,863,558 | 12/1958 | Brondyke | 210/286 |
| 3,216,821 | 11/1965 | Edwards et al. | 75/76 |
| 3,281,238 | 10/1966 | Bachowski et al. | 75/93 |
| 3,528,801 | 9/1970 | Bylund et al. | 75/68 R |
| 3,537,987 | 11/1970 | Copeland | 75/93 |
| 3,738,827 | 6/1973 | Pryor et al. | 75/76 |
| 3,768,999 | 10/1973 | Ohkubo et al. | 75/135 |
| 3,893,917 | 7/1975 | Pryor et al. | 75/76 |
| 3,947,363 | 3/1976 | Pryor et al. | 210/510 |
| 3,962,081 | 6/1976 | Yarwood et al. | 210/773 |
| 4,024,056 | 5/1977 | Yarwood et al. | 210/773 |
| 4,052,198 | 10/1977 | Yarwood et al. | 75/68 |
| 4,058,402 | 11/1977 | Fein | 210/289 |
| 4,088,475 | 5/1978 | Tyler et al. | 75/68 |
| 4,092,153 | 5/1978 | Yarwood et al. | 75/68 |
| 4,152,470 | 5/1979 | Steinegger | 75/68 R |
| 4,165,235 | 8/1979 | Dantzig et al. | 75/93 |
| 4,248,630 | 2/1981 | Balmuth | 75/135 |
| 4,295,884 | 10/1981 | Hieter et al. | 75/93 R |

FOREIGN PATENT DOCUMENTS 385928  6/1973  U.S.S.R. .................... 210/282

Primary Examiner—Ernest G. Therkorn
Attorney, Agent, or Firm— Kelmachter; Howard M. Cohn; Paul Weinstein

[57] ABSTRACT

A disposable bed filter for removing particulate matter and/or reducing oxygen in a poured metal melt is located within a trough. The bed filter preferably comprises discrete layers of bed media located in a trough between entry and exit baffle plates. The layers of bed media include a layer of coarse media and a layer of fine media. The trough is preferably provided with a closeable lid to permit removal of the bed media and to compensate for buoyancy of the bed media if present. In its preferred use, the bed filter forms part of a process for making a metal alloy wherein the bed filter simultaneously reduces the oxygen content of the melt and filters particulate matter from the melt.

22 Claims, 5 Drawing Figures

DISPOSABLE BED FILTER APPARATUS

This application is a division of application Ser. No. 200,342, filed Oct. 24, 1980 now U.S. Pat. No. 4,330,327.

This application is related to co-pending U.S. patent application Ser. No. 200,361, now U.S. Pat. No. 4,330,328 to Tyler et al. filed on an even date with parent application Ser. No. 200,342, now U.S. Pat. No. 4,330,327.

This invention relates to an apparatus for removal of impurities from a poured melt and a process for producing a metal alloy. Particulate matter, particularly non-metallic particulate matter, may be removed from a poured melt and/or oxygen in the poured melt may be reduced by this invention. The apparatus comprises a disposable filter bed located in a preferably flat section of a transfer trough arranged between a source of molten metal such as a furnace and a casting station. In the preferred embodiment, this apparatus is used in conjunction with a copper melt.

The invention herein is particularly concerned with filtration of copper and copper alloys. Copper alloyed with small amounts of reactive elements such as chromium, zirconium, niobium, titanium, etc. has a strong tendency to form clusters of a reactive alloying addition oxide by interaction with oxygen contained within the molten copper melt or by reaction with oxygen dissolved in the alloy as part of the transfer of the molten metal from the source of the molten metal to the molten metal pool from which the ingot is cast. These clusters of reactive element oxides, and on occasion carbides, generally appear as surface defects and slivers in the final strip often making it unacceptable cosmetically. Numerous attempts have been made to solve this problem by a variety of approaches.

One approach has been to use disposable ceramic foam filters after an alloying addition has been made. Illustrative of the use of ceramic foam filters are U.S. Pat. Nos. 3,893,917, 3,947,363, 3,962,081, and 4,024,056. This approach has failed for one of the two following reasons: (1) a reactive addition may attack the body of the ceramic foam filter itself thereby resulting in premature clogging; and (2) the volume of particulate to be removed is too massive to be accommodated by a ceramic foam filter without premature plugging.

Another approach has been to use in-line degassing and filtration of the molten metal. Illustrative of this approach are U.S. Pat. Nos. 4,052,198, 4,092,153, and 4,165,235. This approach utilizes a fluxing gas which is passed through a ceramic foam filter plate to contact the molten metal. Dissolved gases and non-metallic inclusions are thereby abstracted and removed from the melt.

An approach known in the prior art and generally used in conjunction with aluminum melts is the use of bed-type filters. U.S. Pat. No. 2,863,558 discloses passing molten aluminum metal through a heated bed of coarse granules of anhydrous refractory material. The coarse granules are gravitationally held below the surface of the metal. To replace the filter bed after the useful life of the granules has expired, it is necessary to stop the flow of metal, ladle out the loose refractory granules, and replace them with fresh material.

U.S. Pat. No. 3,281,238 discloses passing a molten aluminum metal through a submerged bed of carbonaceous material. The carbonaceous material floats in the aluminum and is held in place by a retainer plate. The carbonaceous material may consist of a layer of fine material and a layer of coarse material. In order to prevent the molten aluminum metal from freezing in the carbonaceous material, the carbonaceous material is preheated.

U.S. Pat. No. 3,537,987 discloses a filtering system utilizing a degassing system in an upstream compartment and a floating filter bed of carbon granules in a downstream compartment. The floating filter bed has a layer of finer carbon granules covered by a layer of coarse carbon granules. The floating filter bed is held in place by a perforated retaining plate.

In accordance with this invention, a simple disposable bed filter is constructed as an integral part of the molten metal transfer system between a source of molten metal such as a holding furnace and a casting station. Removal of particulate matter from and/or reduction of oxygen content in the poured melt can be achieved within the transfer trough itself without the need to construct bowl or basin portions in the transfer trough.

The approach in accordance with this invention utilizes a loose pack of granular materials within the transfer trough which acts as a filtering media. The granular materials are maintained in place by entry and exit baffle plates and by an imperforate closeable lid. The granular materials and the exit baffle plate are arranged to prevent channelling within the filter. The closeable lid is arranged to provide access to the granular materials so that the granular materials can be easily replaced after each cast has been terminated.

Accordingly, it is an object of this invention to provide an apparatus which is capable of providing filtration in a poured melt within the confines of a transfer trough.

It is a further object of this invention to provide an apparatus which provides filtration across substantially the entire cross-sectional area of the filtering media while preventing channelling within the filtering media.

It is a further object of this invention to provide an apparatus which is capable of being disposed of after a cast has been terminated.

These and other objects will become more apparent from the following description and drawings.

Figure 1:
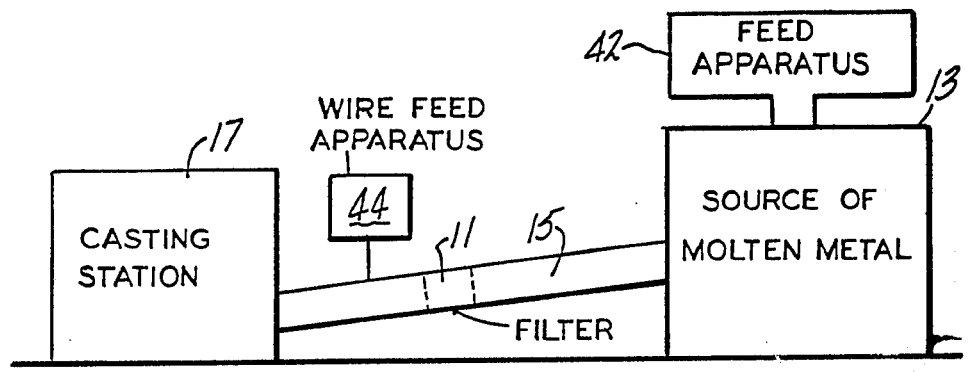
FIG. 1 is a schematic illustration of the casting system.
Figure 2:
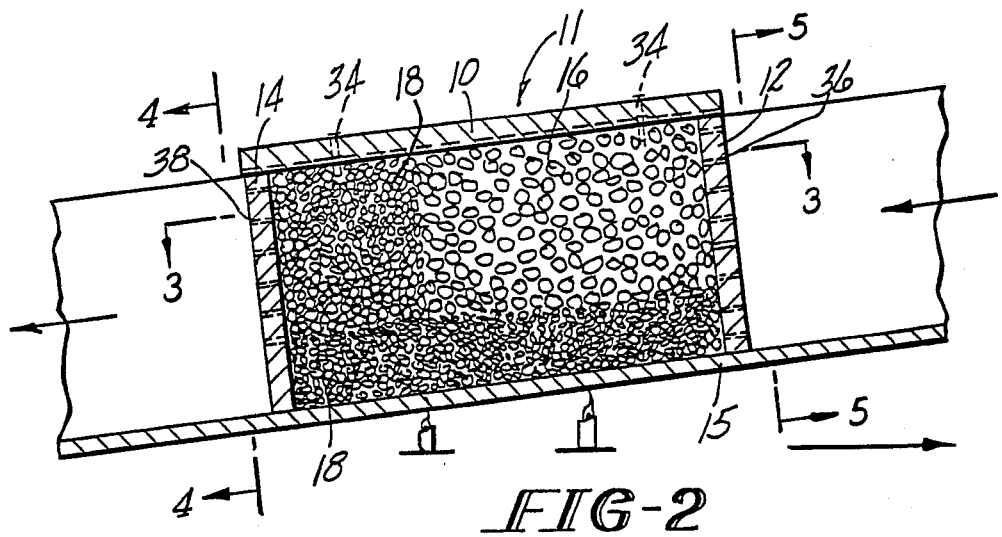
FIG. 2 is a side view of the transfer trough of FIG. 1.

In accordance with this invention, a disposable metal bed filter apparatus for removing impurities from a molten metal is provided. The bed filter apparatus in accordance with this invention may be used either for the purpose of removing particulate matter, generally non-metallic particulate matter, particularly after reactive elements are added to the melt ahead of the filter bed, or for the purpose of reducing oxygen in the poured melt to a low enough level that reactive element additions could be made by wire feed technology at the exit end of the bed. In a preferred embodiment, the bed filter apparatus in accordance with this invention is used in conjunction with a process for making a metal alloy, i.e. a copper alloy, whereby filtering of the molten material occurs after a first reactive element, i.e. chromium, has been added to the base metal, i.e. copper, in the furnace and prior to addition by wire feed technology of a second reactive element, i.e. zirconium, in the launder.

The bed filter apparatus of this invention is capable of being placed in a transfer trough between a source of molten metal such as a holding furnace, banjo, etc. and a casting station without having to construct a deep basin or bowl portion in the transfer trough. After termination of the cast, the bed filter apparatus of this invention lends itself to being easily disposed of and cleaned out.

Referring now to FIGS. 1–5, there is shown by way of example a disposable bed metal bed filter 11 in accordance with a preferred embodiment of the present invention. The bed filter 11 is located within a substantially flat-bottomed transfer trough 15 communicating with a source of molten metal 13 and a casting station 17. The preferred embodiment shows the transfer trough 15 as being slightly inclined. However, the transfer trough 15 may be level. Also, in the preferred embodiment, the transfer trough 15 is substantially U-shaped in cross-section. The flow of the melt from the source of molten metal 13 to the casting station 17 is in a unidirectional, substantially horizontal, and substantially linear fashion. The term horizontal being used to include that which is more horizontal than vertical.

Feed apparatus 42 may be used to add a reactive element to the molten metal prior to the melt passing through the filter. The apparatus 42 can be a hopper, a shovel, a ladle, or any other suitable means for adding a reactive element to the molten metal. A wire feed apparatus 44 such as that disclosed in U.S. Pat. No. 4,088,475, hereby incorporated by reference, may be used to make a reactive element addition after the melt has been filtered.

In the preferred embodiment, the bed filter 11 has bed media comprising a loose pack of granular materials located between an entry baffle plate 12 and an exit baffle plate 14. As previously stated, the bed filter 11 may be used as a means for removing particulates from the melt. In an embodiment where a copper melt is prepared and reactive elements are added to the copper melt ahead of the filter bed, the bed media may be refractory oxides that are not rapidly attacked by molten copper alloys. Examples would include balls or tablets of alumina, chromia, zirconia, etc.

Alternatively, the bed filter 11 may be used as a means for reducing oxygen in a poured melt. For example, the bed filter 11 may be used to reduce oxygen in a poured copper melt to a low enough level that reactive element additions could be made by wire feed technology at the exit end of the bed. In this case, the bed media would be a carbonaceous material of which coke would be a preferred example.

The coke-type bed media can also be used in conjunction with the process whereby a first reactive element is added to the melt ahead of the filter as by feed apparatus 42 and a second reactive element is added to the melt after the filter as by wire feed apparatus 44. In this embodiment, the coke-type bed media has a dual mode of operation, i.e. the removal of ceramic oxide simultaneously with residual deoxidation of the melt followed by addition of a second reactive element after the melt has passed through the filter deoxidizing bed.

In all modes of operation, the bed filter 11 is preferably stratified so as to contain bed media of graded size. In the preferred embodiment, the portion 16 of the bed filter 11 is packed with coarse bed media. The coarse bed media has a general size range of from approximately three-quarters of an inch in diameter to approximately two inches in diameter. The coarse bed media serves to provide initial removal of larger particulates, i.e. the more massive oxide clusters. The portion 18 of the bed filter 11 is packed with fine bed media. The fine bed media has a general size range from approximately one-quarter to three-quarters of an inch in diameter. In the preferred embodiment, the fine bed media ranges in size from one-half to three-quarters of an inch in diameter. The fine bed media preferably extends the entire length of bed filter 11 and preferably has a depth of at least about one-quarter to one-third of the depth of the transfer trough 15. In the preferred embodiment, the fine bed media in the terminal portion of the filter, approximately one-quarter to one-half of the length of the distance between the entry baffle plate 12 and the exit baffle plate 14 as measured from exit baffle plate 14, has a depth substantially equal to the depth of the bed filter 11. The fine bed media 18 serves to remove the smaller particles and to minimize the tendency for channelling. Channelling being the creation of a preferred path of flow for the melt. By minimizing the tendency for channelling, substantially the entire bed filter cross-section becomes active from a filtration standpoint.

The entry baffle plate 12 and the exit baffle plate 14 are both constructed in the preferred embodiment from perforated ceramic plate. It follows that the perforations in the baffle plates 12 and 14 should be small enough so as to prevent expulsion of the various bed media. The perforations 36 in entry plate 12 are substantially distributed throughout and have an area greater than approximately 30% of the cross-sectional area of the transfer trough 15. The cross-sectional area of the transfer trough 15 being the area of the substantially U-shaped channel-like opening of the trough. In the preferred embodiment, the perforations 36 are distributed uniformly and have an area in the range of about 50–60% of the trough cross-sectional area. The perforations 38 in exit plate 14 are substantially located in the upper two-thirds of the plate height. Preferably, the perforations 38 are located in the upper-half of the plate 14. By placing the perforations 38 in the upper portion of plate 14, the melt flows substantially through the entire cross-sectional area of the bed media and channelling at the bottom of the bed media can be avoided. The perforations 38 in exit plate 14 should also have an area greater than approximately 30% of the cross-sectional area of the transfer trough 15, preferably in the range of about 50–60% of the trough cross-sectional area.

Figure 3:
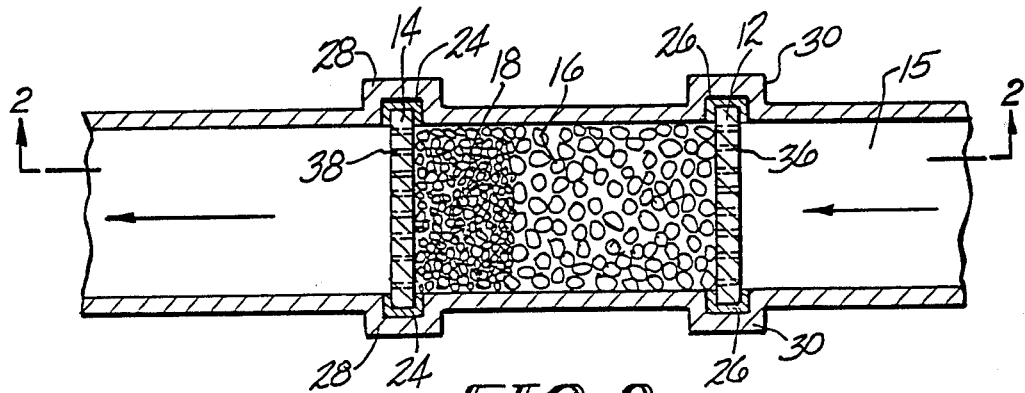
FIG. 3 is a sectional view of the apparatus along lines 3—3 of FIG. 2.
Figure 4:
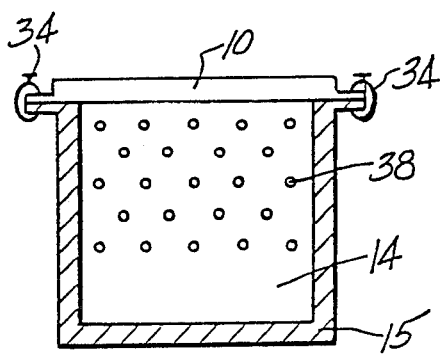
FIG. 4 is an end view of the rear portion of the filter system along lines 4—4 of FIG. 2.
Figure 5:
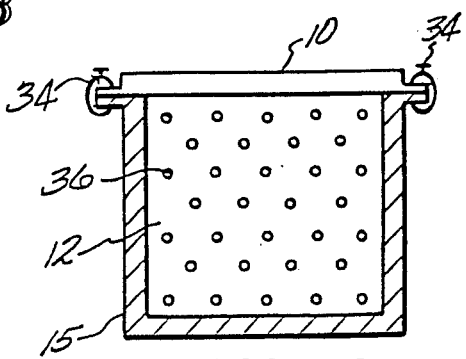
FIG. 5 is an end view of the front portion of the filter system along lines 5—5 of FIG. 2.

As best shown in FIG. 3, plates 12 and 14 are inserted into notches or grooves 28 and 30, respectively. These notches or grooves 28 and 30 are formed in the trough sidewalls. The notches or grooves 28 and 30 have a width slightly larger than the plate widths. A packing 24 and 26 is inserted between the edges of the plates 12 and 14 and the notches 28 and 30 to hold the plates in place. The packing 24 and 26 is preferably made of a cloth-type or wool-type material. The construction as shown makes removal of the plates easier.

Preferably, transfer trough 15 is also provided with a closeable, imperforate lid 10 which bears upon the filter bed media. The closeable lid serves two purposes. The first of these purposes is to provide access to the disposable bed filter media. The second of these purposes is to maintain the bed media in a fixed position. For example, in the preferred embodiment, the closeable, imperforate lid 10 compensates for the buoyancy effect that exists as a result of the bed media having a density less than the density of the copper melt. Conventional means, such as C-clamps 34, may be used to hold the closeable lid 10 in a closed position.

The filter bed apparatus is constructed by first inserting plates 12 and 14 into notches 28 and 30 and then inserting packing 24 and 26 between the plates and the notches. The loose pack bed media 16 and 18 are then manually inserted between the plates. The fine bed media 18 is first inserted in place and the remainder of the space between the plates is filled with the coarse bed media 16. Prior to placing the lid 10 in position, the filter material is preheated to a temperature close to the molten metal temperature. The preheating of the filter material is performed by conventional gas flames used to preheat the transfer trough 15.

After a cast has been terminated, it is intended that the bed media be removed. This is accomplished by removing the lid 10 and using standard means, such as a ladle, to run off the remaining molten metal. Once this has been done, the baffle plates 12 and 14 are removed and the bed media 16 and 18 are manually removed from the transfer trough, i.e. by using a ladle to remove the bed media.

In accordance with the present invention, it is possible to use a substantially flat filter located within the configuration of a substantially flat transfer trough to remove particulates from and/or reduce the oxygen content of a poured melt. Further, the filter is held in place by entry and exit plates and by a closeable lid which also provides access to the filter for removal of the filter material or media.

The patents set forth in the background of this application are intended to be incorporated by reference herein.

While, in the preferred embodiment, the bed media comprises either a refractory oxide or a carbonaceous material, depending upon the molten metal, any suitable material or combination of materials may be used. Furthermore, while, in the preferred embodiment, the bed media is removed after each cast, the bed media may be used for several casts.

While, in the preferred embodiment, the source of molten metal has been described as being a holding furnace or banjo, the filter of this invention may be used with any source of molten metal. Furthermore, the filter of this invention may be used in conjunction with any casting arrangement.

It is apparent that there has been provided in accordance with this invention a filter apparatus which fully satisfies the objects, means, and advantages set forth hereinbefore. While the invention has been described in combination with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A filter apparatus for removing impurities from a molten metal comprising:
   a trough for conveying a flow of said molten metal in a desired direction, said trough being sump-free;
   a bed filter for removing the impurities in the molten metal located within the confines of said sump-free trough;
   said bed filter comprising layers of different sized bed media overlapped longitudinally in the direction of said molten metal flow and having a cross-sectional area substantially transverse to said molten metal flow direction;
   said layers being overlapped longitudinally for substantially preventing channelling in said bed filter and for increasing molten metal flow through substantially all of said cross-sectional area; and
   perforated means for assisting in substantially preventing said channelling in said bed filter and for increasing said flow through substantially all of said cross-sectional area, said perforated means being located adjacent an exit portion of said bed filter.

2. The filter apparatus of claim 1 wherein: said perforated means comprises an exit baffle plate.

3. The filter apparatus of claim 2 wherein: said exit baffle plate extends substantially perpendicular to said molten metal flow direction and has a plurality of perforations substantially in its upper two-thirds.

4. The filter apparatus of claim 3 wherein: said plurality of perforations are located substantially in the upper-half of said exit baffle plate.

5. The filter apparatus of claim 2 further including: an entry baffle plate means located upstream of said bed filter for retaining said bed filter in position.

6. The filter apparatus of claim 5 wherein: said entry and exit baffle plates are formed by ceramic plates.

7. The filter apparatus of claim 5 further including: said trough having sidewalls; a plurality of notches in said sidewalls; said baffle plates being mounted within said plurality of notches; and packing means between said baffle plates and said notches.

8. The filter apparatus of claim 5 wherein: each of said entry and exit baffle plates have a plurality of perforations; said trough has a cross-sectional area; and said perforations in each of said baffle plates comprises an area greater than 30% of said trough cross-sectional area.

9. The filter apparatus of claim 8 wherein: said perforations in each of said baffle plates comprise an area in the range of about 50% to 60% of said trough cross-sectional area.

10. The apparatus of claim 1 wherein said bed filter comprises means for simultaneously reducing the oxygen content of said molten metal and removing particulate matter from said molten metal.

11. The apparatus of claim 1 further comprising means for adding a reactive material after said molten metal has passed through said bed filter.

12. The apparatus of claim 11 wherein said reactive material adding means comprises means for adding said reactive material into said molten metal by wire-feeding.

13. The apparatus of claim 11 further comprising means for adding an additional reactive material before said molten metal has passed through said bed filter.

14. A disposable filter apparatus for a molten metal transfer system comprising:
   a trough for conveying a flow of molten metal in a desired direction;
   a removable bed filter located within the confines of said trough;
   said bed filter comprising layers of different sized bed media overlapping longitudinally in the direction of said molten metal flow and having a cross-sectional area substantially transverse to said molten metal flow direction, said layers being overlapped longitudinally for substantially preventing channelling in said bed filter and for increasing molten metal flow through substantially all of said cross-sectional area; and an imperforate, removable lid mounted to said trough for providing access to said removable bed filter and for maintaining said removable bed filter in a fixed position in said trough.

15. The disposable filter apparatus of claim 14 wherein: the molten metal has a density; said bed filter comprises a material having a density less than the molten metal density; and said lid counteracts a buoyant effect created by said less dense material.

16. The disposable filter apparatus of claim 14 further comprising: means to attach said lid to said trough.

17. The disposable filter apparatus of claim 14 wherein: said bed filter comprises a loose pack of granular material which may be manually ladled out after a cast has been terminated.

18. The disposable filter apparatus of claim 14 further including: baffle plate means to maintain said bed filter in a fixed longitudinal position.

19. The apparatus of claim 14 wherein said removable bed filter comprises means for simultaneously reducing the oxygen content of said molten metal and removing particulate matter from said molten metal.

20. The apparatus of claim 14 further comprising means for adding a reactive material after said molten metal has passed through said removable bed filter.

21. The apparatus of claim 20 wherein said reactive material adding means comprises means for adding said reactive material into said molten metal by wire-feeding.

22. The apparatus of claim 20 further comprising means for adding an additional reactive material before said molten metal has passed through said removable bed filter.

* * * * *